United States Patent [19]

Schwarz et al.

[11] Patent Number: 4,916,652
[45] Date of Patent: Apr. 10, 1990

[54] DYNAMIC MULTIPLE INSTRUCTION STREAM MULTIPLE DATA MULTIPLE PIPELINE APPARATUS FOR FLOATING-POINT SINGLE INSTRUCTION STREAM SINGLE DATA ARCHITECTURES

[75] Inventors: Eric M. Schwarz, Endicott; Stamatis Vassiliadis, Vestal, both of N.Y.

[73] Assignee: International Business Machines Corporation, Armonk, N.Y.

[21] Appl. No.: 102,985

[22] Filed: Sep. 30, 1987

[51] Int. Cl.[4] .............................................. G06F 7/38
[52] U.S. Cl. ................................... 364/748; 364/200; 364/736
[58] Field of Search ............... 364/200, 736, 748, 900, 364/231.8

[56] References Cited

U.S. PATENT DOCUMENTS

| | | | |
|---|---|---|---|
| 3,840,861 | 10/1974 | Amdahl et al. | 364/200 |
| 4,390,946 | 6/1983 | Lane | 364/200 |
| 4,594,655 | 6/1986 | Hao et al. | 364/736 |

Primary Examiner—Eugene R. Laroche
Assistant Examiner—Seung Ham
Attorney, Agent, or Firm—David S. Romney; John H. Bouchard

[57] ABSTRACT

A dynamic multiple instruction stream, multiple data, multiple pipeline (MIMD) apparatus simultaneously executes more than one instruction associated with a multiple number of instruction streams utilizing multiple data associated with the multiple number of instruction streams in a multiple number of pipeline processors. Since instructions associated with a multiple number of instruction streams are being executed simultaneously by a multiple number of pipeline processors, a tracking mechanism is needed for keeping track of the pipe in which each instruction is executing. As a result, a dynamic history table maintains a record of the pipeline processor number in which each incoming instruction is executing, and other characteristics of the instruction. When a particular instruction is received, it is decoded and its type is determined. Each pipeline processor handles a certain category of instructions; the particular instruction is transmitted to the pipeline processor having its corresponding category. However, before transmission, the pipeline processor is checked for completion of its oldest instruction by consulting the dynamic history table. If the table indicates that the oldest instruction in the pipeline processor should complete, execution of the oldest instruction in such processor completes, leaving room for insertion of the particular instruction therein for execution. When the particular instruction is transmitted to its associated pipeline processor, information including the pipe number is stored in the dynamic history table for future reference.

17 Claims, 11 Drawing Sheets

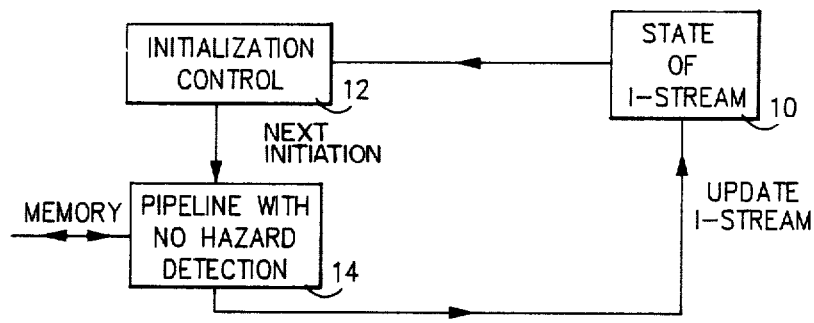

FIG.1

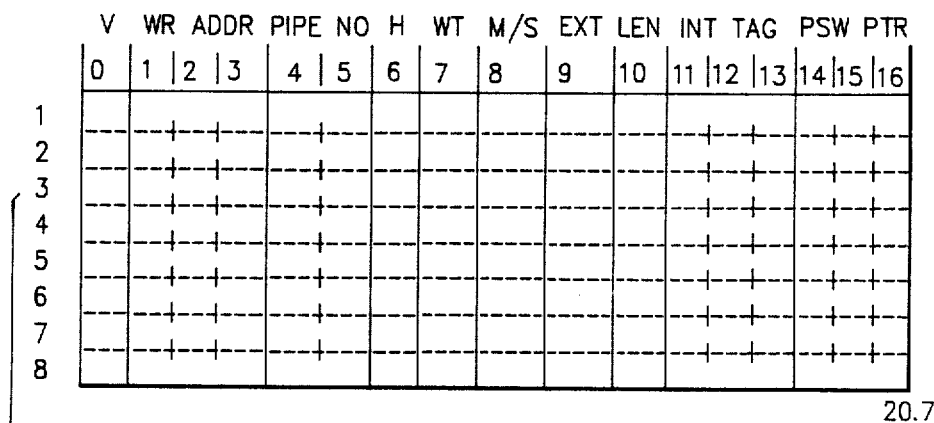

| V | VALID BIT |
|---|---|
| WR ADDR | WRITE ADDRESS |
| PIPE NO | PIPE NUMBER (00-ADD, 01-MULT, 10-LOAD RX, 11-MISCELLANEOUS) |
| H | HARDWIRED FPU REQUEST IF 1, IF 0 MICROCODE INSTRUCTION |
| WT | WRITE TYPE |
| M/S | IF 1 MIMD, IF 0 SISD TYPE PIPE |
| EXT | EXTENDED RESULT MUST BE WRITTEN |
| LEN | IF 1 LONG RESULT, IF 0 SHORT RESULT |
| INT TAG | INTERRUPT TAG WHICH UNIQUELY DEFINES INSTRUCTION IN CPU STACK |
| PSW PTR | IDENTIFIES RETRY POINTER FOR THE INSTRUCTION |

FIG.4

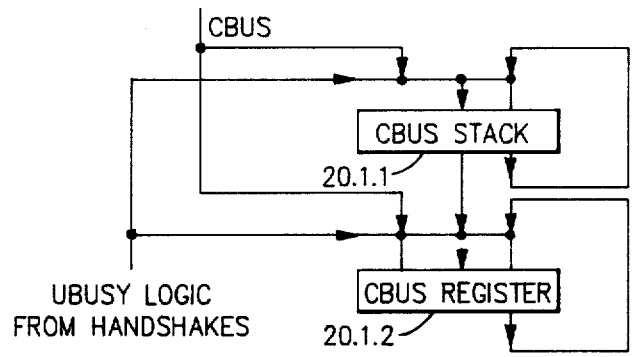

FIG.3a

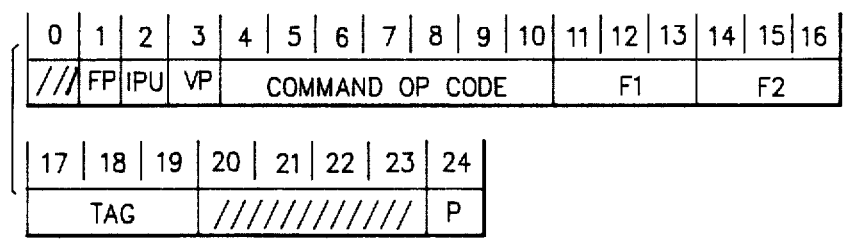

FIG.3b

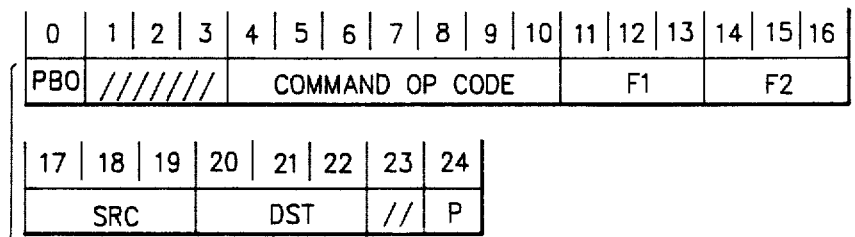

FIG.3c

| PBO | MICROCODE MODE |
|---|---|
| FP | FLOATING POINT UNIT REQUEST |
| IPU | INSTRUCTION PROCESSING UNIT CACHE REQUEST |
| VP | VECTOR PROCESSOR REQUEST |
| COMMAND | THE INSTRUCTION'S OPCODE |
| F1 | OPERAND 1'S FPR ADDRESS (ENCODED) |
| F2 | OPERAND 2'S FPR ADDRESS (ENCODED) |
| SRC | A 3 BIT FIELD WHICH INDENTIFIES THE SOURCE PROCESSOR BUS UNIT |
| DST | A 3 BIT FIELD WHICH IDENTIFIES THE DESTINATION PROCESSOR BUS UNIT |
| TAG | AN INTERRUPT TAG FIELD WHICH UNIQUELY IDENTIFIES INSTRUCTION IN CPU'S INSTRUCTION STACK |
| P | PARITY BIT |
| /// | RESERVED FIELD |

| | 0 | 1 | 2 | 3 | 4 | 5 | 6 | 7 |
|---|---|---|---|---|---|---|---|---|
| | ADDR | | | VI | VD | M/S | RX | 2BY |

| ADDR | OPERAND FLOATING POINT REGISTER ADDRESS |
|---|---|
| VI | VALID INSTRUCTION IN THIS CYCLE OF PIPE |
| VD | VALID DATA IN ASSOCIATED REGISTER |
| M/S | MIMD/SISD PIPES |
| RX | RX TYPE INSTRUCTION |
| 2BY | 2 CYCLE BYPASS IN PROGRESS |

| 0 | 1 | 2 | 3 | 4 | 5 | 6 | 7 | 8 | 9 | 10 | 11 |
|---|---|---|---|---|---|---|---|---|---|----|----|
| ADDR | | | VI | VD | VR | RX | 2BY | EXT | LI | FLP | INTL |

| | |
|---|---|
| ADDR | OPERAND FLOATING POINT REGISTER ADDRESS |
| VI | VALID INSTRUCTION IN THIS CYCLE OF PIPE |
| VD | VALID DATA IN ASSOCIATED REGISTER |
| RX | RX TYPE INSTRUCTION |
| 2BY | 2 CYCLE BYPASS IN PROGRESS |
| VR | VALID DATA (RESULT) NOT NECESSARILY ASSOCIATED WITH AN INSTRUCTION |
| EXT | EXTENDED RESULT |
| LI | LONG INPUT OPERANDS |
| FLP | IF 1 THEN IT IS A FLOATING POINT MULTIPLY, IF 0 THEN FIXED POINT |
| INTL | Y'S OPERAND IS INTERLOCKED |

FIG.6b

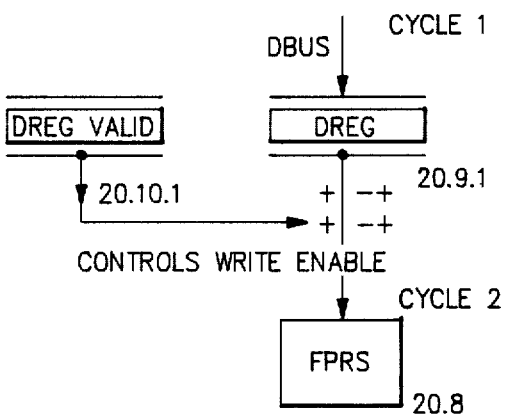

FIG.7

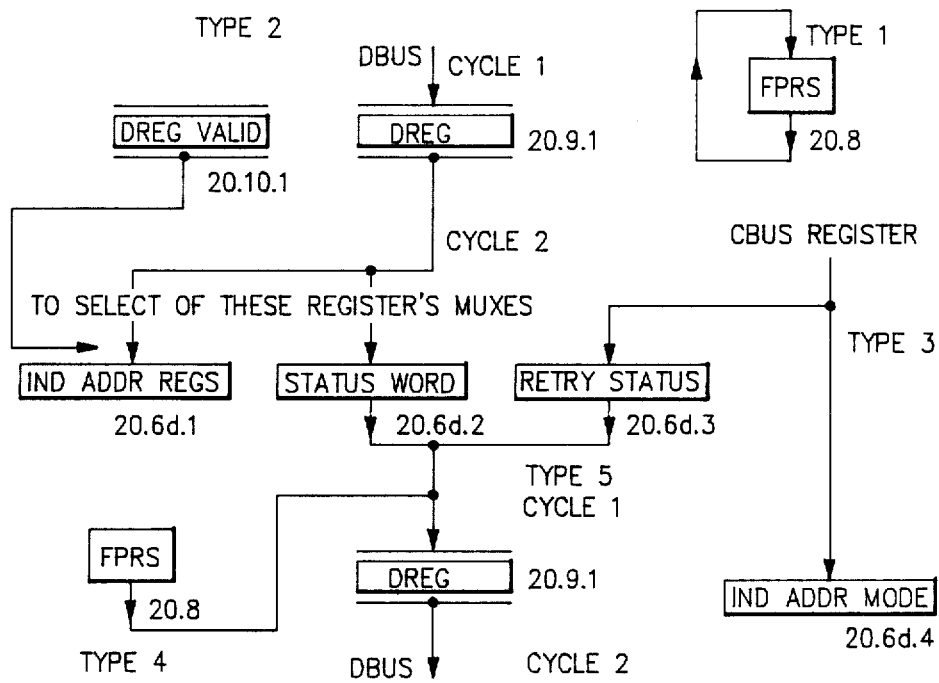

FIG.8

| 0 | 1 | 2 | 3 | 4 | 5 | 6 | 7 | 8 | 9 |
|---|---|---|---|---|---|---|---|---|---|
| IADDR | | | PIPE NO | | VI | DR | S1 | S2 | EXE |

| IADDR | INSTRUCTION ADDRESS, IF NON ZERO THERE IS CROSS-BOUNDARY DATA |
|---|---|
| PIPE NO | PIPE NUMBER |
| VI | VALID INTSRUCTION |
| DR | DATA FOR THIS INSTRUCTION IS IN DREG |
| S1 | DATA FOR THIS INSTRUCTION IS IN S1 REG |
| S2 | DATA FOR THIS INSTRUCTION IS IN S2 REG |
| EXE | INSTRUCTION IS EXECUTING; IS OUT OF CBUS REG |
| P | PARTIALLY VALID (CROSS-BOUNDARY SITUATION) |
| F | FULLY VALID DATA; ALL BYTES RECEIVED |

| | CYCLE 0 | CYCLE 1 | CYCLE 2 | CYCLE 3 | CYCLE 4 |
|---|---|---|---|---|---|
| LOAD RX FPR1 | CBUS | CBUS REG<br>DBUS VALID<br>DC ACKNOWLEDGE<br>DYNAMIC HISTORY<br>TABLE 1 | DREG VALID<br>WRITE FPRS<br>COMPLETE<br>DHT1 | | |
| MULTIPLY FPR1*2 → 1 | | CBUS | CBUS REG<br>BYPASS DREG TO<br>XA REG<br>FPR TO YREG<br>ACKNOWLEDGE<br>DHT2 | XA TO XB<br>Y TO Y<br>DHT1 | M1<br>Y TO Y<br>XB TO XB<br>DHT1 |
| ADD FPR 3+4 → 3 | | | CBUS | CBUS REG<br>FPR TO A, B<br>ACKNOWLEDGE<br>ALIGN<br>DHT2 | ADD<br>LOAD S<br>DHT2 |

| | CYCLE 5 | CYCLE 6 | CYCLE 7 |
|---|---|---|---|
| MULTIPLY FPR1*2 → 1 | M2<br>LOAD P<br>DHT1 | P VALID<br>DHT 1<br>WRITE FPRS<br>COMPLETE | WRITE FPRS<br>COMPLETE<br>DHT1 |
| ADD FPR 3+4 → 3 | WAIT<br>HOLD S<br>DHT2 | WAIT<br>HOLD S<br>DHT2 | |

DYNAMIC MULTIPLE INSTRUCTION STREAM MULTIPLE DATA MULTIPLE PIPELINE APPARATUS FOR FLOATING-POINT SINGLE INSTRUCTION STREAM SINGLE DATA ARCHITECTURES

BACKGROUND OF THE INVENTION

The subject matter of this invention relates to computing systems, and more particularly, to a multiple instruction stream, multiple data pipeline for use in a functional unit of such computing system, such as a floating point unit, which is designed to operate in conjunction with a single instruction stream, single data architecture.

Most computer processors utilize some form of pipelining. In a pipelined computer processor, more than one instruction of an instruction stream is being executed at the same time. However, each of the instructions being executed are disposed within different stages of the pipe. The performances of a pipelined processor is necessarily better than the performance of a non-pipelined processor. There are different types of pipelining. One type is termed "single instruction stream single data (SISD)" pipelining. In the SISD type of pipelining, individual instructions are pipelined with at most a single data operation. However, using the SISD pipelining approach, many "hazards" were encountered. Hazards are encountered upon entering the pipeline at a maximum possible new data rate. The "hazards" can be divided in two categories, namely, structural hazards and data dependent hazards. A structural hazard occurs when two pieces of data attempt to use the same hardware and thus collisions occur. Data dependent hazards may occur when the events transpiring in one stage of a pipeline determines whether or not data may pass through another stage of the pipeline. For example, in a pipeline having two stages, each stage requiring use of a single memory, when one stage is using the memory, the other stage must remain idle until the first stage is no longer using the memory. Another type of pipeline approach is termed "multiple instruction stream, multiple data (MIMD)" pipelining. When the MIMD type of pipelining is being used, rather than pipe individual instructions, as in the SISD pipeline approach, instruction "streams" are piped. The MIMD pipeline approach did not encounter the hazards problem. However, although instruction streams are being piped in the MIMD approach, a first instruction stream must complete execution before a second instruction stream could commence execution. Thus, although the performance of the MIMD pipeline was better than the performance of the SISD pipeline, the performance of the MIMD pipeline was limited, by the "one instruction stream at a time" execution philosophy.

SUMMARY OF THE INVENTION

Accordingly, it is a primary object of the present invention to introduce a novel type of pipeline for computer functional units, hereinafter termed a "dynamic MIMD pipeline".

It is another object of the present invention to introduce the dynamic MIMD pipeline which is not limited by the "one instruction stream at a time" execution philosophy.

It is another object of the present invention to introduce the dynamic MIMD pipeline capable of simultaneously executing a multiple number of instruction streams in a multiple number of pipelines thereby increasing substantially the performance of the functional unit embodying the dynamic MIMD pipeline.

In accordance with these and other objects of the present invention, a plurality of pipes are capable of piping, for execution thereof, a further plurality of instructions. Each pipe is capable of simultaneously storing, for execution, a plurality of instructions. Thus, the plurality of pipes are capable of simultaneously storing, for execution, the further plurality of instructions. The further plurality of instructions are chosen from a plurality of instruction streams which are executing simultaneously in the plurality of pipes. Since the instructions in a particular pipe may be in various stages of completion of execution, in order to keep an accurate record of the execution disposition of each instruction in the pipe, a dynamic history table stores information associated with each instruction disposed in each of the plurality of pipes, the information for each instruction including the pipe number in which the instruction is temporarily stored, and the status of completion of execution of the particular instruction. A handshakes and global hazards circuit determines the busy status of the functional unit, in which the dynamic MIMD pipe is embodied, and responds to other functional units in the computer system, such as the central processing unit (CPU). It also determines if any hazards exist. If the functional unit is not busy and no hazards exist, the next instruction from one of the plurality of instruction streams enters the next available pipe. An MIMD/SISD switch circuit determines if an incoming instruction is greater than "X" bits long (e.g.—64), and if so, the switch switches the dynamic MIMD pipeline of the present invention to the standard SISD mode and executes the incoming instruction in the "one instruction stream at a time" execution philosophy mode. SISD is also invoked for "difficult" instructions which are considered to be divides and square roots.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understand of the present invention will be obtained from the detailed description of the preferred embodiment presented hereinbelow, and the accompanying drawings, which are given by way of illustration only and are not intended to be limitative of the present invention, and wherein:

FIG. 1 illustrates a block diagram of a prior art standard MIMD architecture pipeline;

FIG. 3 illustrates the instruction stack 20.1 of FIG. 2 and includes FIGS. 3a–3c with suitable legends in tabular format;

FIG. 4 illustrates with appropriate legends the dynamic history table 20.7 of FIG. 2;

FIG. 7 illustrates the pipe3 (LOAD RX) 20.6c of FIG. 2;

FIG. 8 illustrates the pipe4 (MISCELLANEOUS) 20.6d of FIG. 2;

FIG. 12 illustrates an example instruction stream.

DETAILED DESCRIPTION OF THE PREFERRED EMBODIMENT

Figure 2:
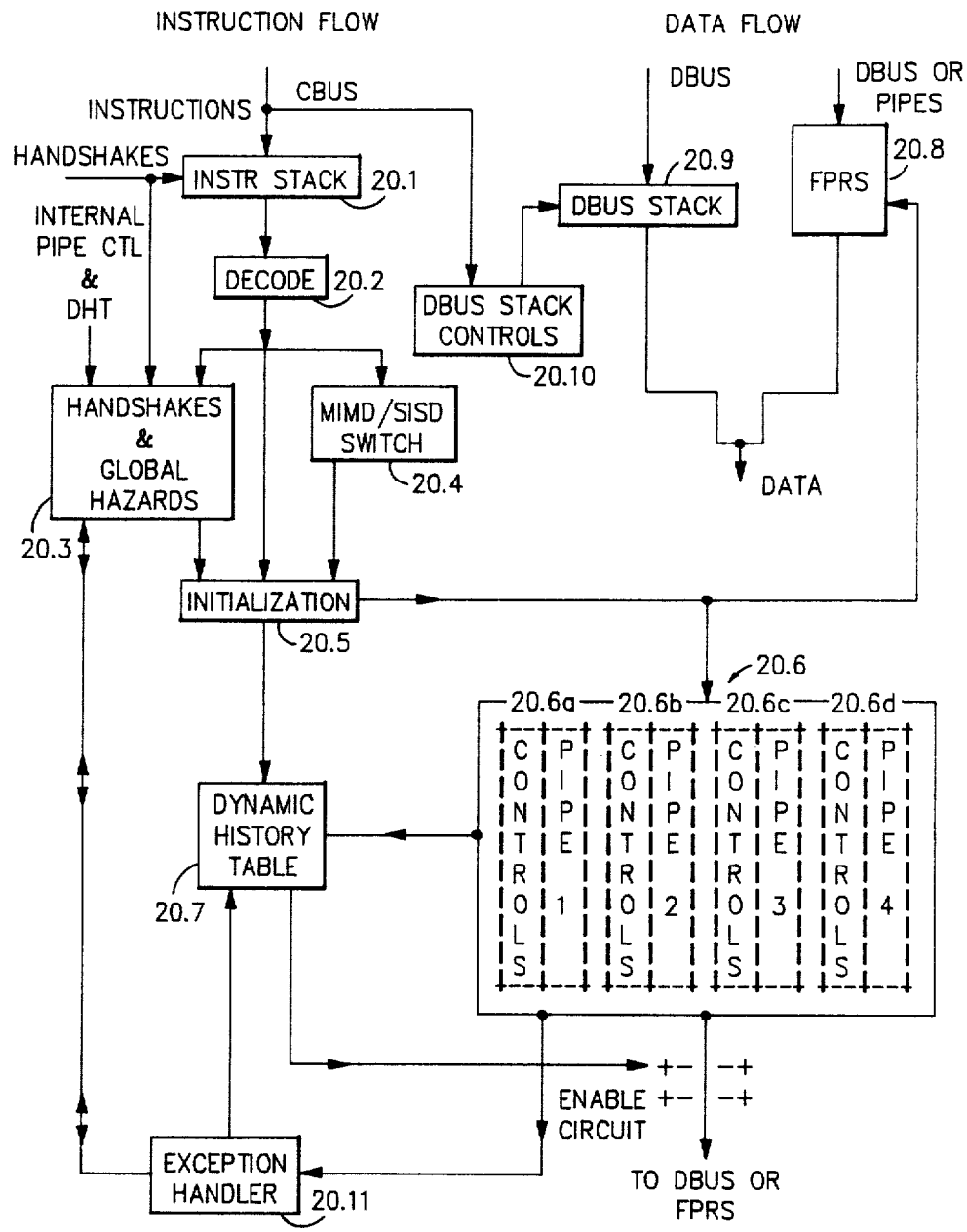
FIG. 2 illustrates the dynamic MIMD/SISD pipeline floating point unit 20 of the present invention.

By way of background information, the dynamic MIMD pipeline of the present invention is incorporated into a functional unit of a computer system. Such a functional unit may be a floating point unit (FPU). In addition to the FPU, the computer system also includes a cache, a central processing unit (CPU), and a vector processor (VP). The Floating Point Unit (FPU) receives data directly from the cache, the Central Processing Unit (CPU), or the Vector Processor (VP); and receives instructions from the CPU. The CPU does not control the data coming from the cache. The CPU requests date (from the cache) while sending instructions to the FPU. While the data is being accessed by the CPU from the cache, the CPU continues to send instructions to the FPU without regard to synchronization of the cycle by which data is being accessed from the cache with the cycle by which the corresponding instructions are being sent to the FPU. Therefore, the data arriving at the FPU at cycle N may be data pertaining to an instruction delivered to the Floating point unit in cycle M, where M≦N. The CPU requests that certain operations be performed by the FPU and other units, such as the cache, via a bus called the CBUS. The CBUS is the only means by which instructions are communicated between the CPU and the FPU. The CBUS conducts handshake control signals and instruction opcodes. When the CPU transmits these requests, the functional units to which these requests are sent are called Processor Bus Units (PBU). The FPU comprises one of the PBUs. When the CPU encounters an instruction which it cannot execute, and a PBU should execute the instruction, the CPU transmits a Processor Bus Operation (PBO) signal to the appropriate PBU. For instance, if the CPU decoded an instruction to be a multiple floating point long, since it is much easier for the FPU to perform this operation, the CPU transmits the PBO signal to the FPU requiring the FPU to perform the multiply floating point long instruction.

The FPU comprises two main parts: a first section in which data actually flows, and a second section into which instructions are introduced and subsequently converted into control signals. This specification describes the second section.

Referring to FIG. 1, a prior art MIMD pipeline system is illustrated.

In FIG. 1, a storage 10 stores a plurality of instruction streams, and in particular, the state of each such stream. An initialization control 12 is connected to the output of the storage 10, and a pipeline circuit 14 is connected to the output of the initialization control 12, the pipeline circuit 14 having no hazards detection circuit. The output of the pipeline 14 is connected to the storage 10.

In operation, an instruction stream, stored in storage 10 of FIG. 1, is transmitted to the initialization control 12. The initialization control 12, in response thereto, transmits each instruction of the instruction stream, one at a time, to the pipeline circuit 14. The instructions are piped within pipeline circuit 14 and executed, one at a time. In response, updated instructions are transmitted from the pipeline circuit 14 for storage in storage 10. When the last instruction of the instruction stream is transmitted to the pipeline circuit 14 from the initialization control 12, piped and executed therein, the last updated instruction of the original instruction stream is transmitted to storage 10. At this point, another instruction stream is transmitted from the storage 10 to the initialization control 12 for execution thereof in the pipeline circuit 14. It is evident that, in the configuration of FIG. 1, the original instruction stream must complete piping and execution within the pipeline circuit 14 before the next instruction stream may be transmitted from storage 10 to the initialization control 12 for piping and execution within the pipeline circuit 14. This is the limitation and disadvantage associated with the standard MIMD pipeline approach.

Referring to the FIG. 2, a dynamic MIMD pipeline 20, according to the present invention, is illustrated.

In FIG. 2, the CBUS is connected to an instruction stack 20.1. An output of the instruction stack 20.1 is connected to a decode circuit 20.2. The decode circuit 20.2 output is connected to a handshakes and global hazards circuit 20.3, a mimd/sisd switch 20.4, and an initialization circuit 20.5. The outputs of the handshakes and global hazards circuit 20.3 and the mimd/sisd switch 20.4 are connected to the inputs of the initialization circuit 20.5. The initialization circuit 20.5 output is connected to a dynamic history table 20.7, to pipeline circuits 20.6, and to floating point registers (FPR) 20.8. The handshakes and global hazards circuit 20.3 output is also connected to an exception handler circuit 20.11, the output of which is further connected to the dynamic history table 20.7. Pipeline circuits 20.6 are also connected to the dynamic history table 20.7 and to the exception handler circuit 20.11, and produce an output which is conducted on a bus called the DBUS which is connected to the data cache, and conducted to the FPR 20.8 which is a local architecturally defined storage. The output of the dynamic history table 20.7 is used to control the gating of the output to the DBUS and to the FPR 20.8. The CBUS, in addition to being input to the instruction stack 20.1, is also input to a DBUS stack controls 20.10 circuit. The output of the DBUS stack controls 20.10 circuit is connected to a DBUS stack 20.9, the input of which is connected to the DBUS. The output of the DBUS stack 20.9 and the output of the FPRs 20.8 generates the data which begins the data flow.

The dynamic MIMD pipeline of the present invention, illustrated in FIG. 2, may be subdivided into two paths: one for instructions and controls (CBUS path), and the other for data flow (DBUS path). The instructions are received via the CBUS and put in the instruction stack 20.1, and then decoded via decoder 20.2. The data is introduced into the dynamic MIMD pipeline of FIG. 2 via the DBUS.

The handshakes and global hazards circuit 20.3 of FIG. 2 transmits "handshake" signals to the CPU and detects global hazards. A further construction of the handshakes and global hazards circuit 20.3 may be found in FIG. 10 of the drawings. A more detailed description of the handshakes and global hazards circuit 20.3 of FIG. 10 will be set forth below in one of the following paragraphs of this specification. The CBUS contains a set of handshake signals to be transmitted between the CPU to each PUB, including the FPU. When the FPU receives a request via the CBUS, the handshakes and global hazards circuit 20.3 of the FPU is required to send an acknowledge signal, a busy signal, or an interrupt signal back to the CPU if the CBUS request was sent from the CPU and the FPU is the only PBU involved in the request. The Acknowledge handshake signal is sent from the FPU to the CPU if a CBUS request is sent to the FPU and the FPU is not BUSY. The interrupt signal is sent from the FPU to the CPU if a data exception is encountered and critical information is stored in the status word. The busy handshake signal is sent from the FPU to the CPU if the FPU cannot accept another instruction for execution. The handshake signals, acknowledge, busy, interrupt, are sent to the CPU from the handshakes and global hazards circuit 20.3 of the FPU. Global hazards are detected in the handshakes and global hazards circuit 20.3 of the FPU and a signal is transmitted therefrom, for transmission to the initialization circuit 20.5, representative of the existence of such hazards. The handshake logic 20.3 (in connection with the initialization circuit 20.5) delivers the appropriate responses of the FPU to the other processor bus units (PBU). It also helps to detect the beginning and the end of an instruction stream. The global hazards circuit 20.3 detects the existence of hazards due to data dependencies of instructions on other executing instructions (data interlock).

Depending upon the incoming instruction being decoded by decoder 20.2, the MIMD/SISD switch 20.4 switches to either SISD mode or MIMD mode. If an incoming instruction involves operands more than 64 bits in length or if an instruction is determined to be difficult to execute, the MIMD/SISD switch 20.4 selects the SISD mode, otherwise it uses the MIMD mode.

The specific instructions which are considered to be "difficult" and which invoke SISD mode are:
  The Divides, both floating and fixed point
  The Square Roots
  Operations which involve extended operands
During execution in the SISD mode, everything is shutdown except for the execution of the difficult instruction; this is accomplished by holding the BUSY signal, generated from the handshakes circuit 20.3 of the FPU to the CPU, active. This stops the CPU from sending any more requests to the FPU via the CUBS. The following instructions or any of their combinations will cause MIMD/SISD switch 20.4 to switch the pipeline mode to the MIMD mode:
  FLOATING POINT OPERATIONS
    ADDs
    COMPAREs
    HALVE
    LOADs
    MULTIPLYs
    STOREs
    SUBTRACTs
  FIXED POINT OPERATIONS—microcode
    MULTIPLY
  OTHER OPERATIONS—microcode
    LOADs
    STOREs
    STATUS WORD
    INDIRECT MODE
    RETRY The following instructions will cause MIMD/SISD switch 20.4 to switch the pipeline mode to the SISD mode.
  FLOATING POINT OPERATIONS—microcode
    ADD extended
    MULTIPLY extended
    DIVIDEs
    DIVIDE extended
    SQUARE ROOT
    LOAD rounded extended
  FIXED POINT OPERATIONS—microcode
    DIVIDE The initialization circuit 20.5 of FIG. 2 starts the pipe, and updates the Dynamic History Table 20.7. A further construction of the initialization circuit 20.5 may be found in FIG. 11 of the drawings. A more detailed description of the initialization circuit 20.5 of FIG. 11 will be set forth below in one of the following paragraphs of this specification. In connection with the handshake/hazard logic 20.3, the initialization circuit 20.5 determines the beginning and end of an instruction stream and determines if any data dependent hazards exist. After the decode step, the type of instruction, as indicated by the output from the decoder 20.2, is compared, in the initialization circuit 20.5 and the global hazard circuit 20.3, with the completion status of the first cycle status of the appropriate pipe to use, as indicated by the internal pipe controls 20.6a–d. If there is no global hazards, as indicated by the dynamic history table 20.7, and no immediate internal hazards exist, as indicated by the output of the handshakes and global hazards circuit 20.3, the instruction is initialized. If the BUSY handshake signal is developed by the handshakes and global hazards circuit 20.3, no initialization takes place in the initialization circuit 20.5 Initialization involves starting the status controls of the appropriate pipe and also entering a new line in the Dynamic History Table. Notification of initialization is handled by the handshake controls 20.3 which sends the acknowledge signal to the CPU indicating that the instruction has been started or by sending a busy signal to the CPU, indicating that the FPU has the instruction but the pipe of incoming instructions had better be stopped because the FPU cannot handle very many more instructions. The initialization logic 20.5 and the global hazards logic 20.3 determine the beginning and end of a stream of instructions. The response "acknowledge" and "not busy" to an instruction not already in a stream indicates the beginning of a stream, and "busy" indicates the end of a stream. The global hazards circuit 20.3 is used to determine hazards due to data "dependencies". The initialization logic 20.5 adds new lines to the dynamic history table 20.7. Therefore, initialization consists of handshaking, updating the history file, and possibly dealing with data hazards.

The dynamic MIMD pipeline of FIG. 2 includes four pipeline circuits 20.6: pipe1 20.6a, pipe2 20.6b, pipe3 20.6c, and pipe4 20.6d. Thus, there are four categories of instructions, one category for each pipe 20.6a through 20.6d.

Data on the DBUS is processed by either the FPRs 20.8, or the DBUS stack 20.9 which is controlled by the DBUS stack controls 20.10.

The exception handler 20.11 determines if there is an exception. The types of data exceptions that can occur while executing instructions are:
  Exponent Overflow Exception
  Exponent Underflow Exception
  Floating Point Divide Exception
  Fixed Point Divide Exception
  Significance Exception
  Square Root Exception When an instruction is detected that causes one of these exceptions, all instructions received after this must be cancelled as if they were never received even though they may be already executing; this is a property of a SISD architecture which must be preserved by the dynamic MIMD architecture. This is done by changing all the valid bits in the Dynamic History Table to zero after the instruction causing the exception has completed. In addition, the CPU and the other units are notified of the interrupt and they must cancel their instructions until the CPU begins an interrupt handler routine.

The dynamic MIMD pipeline 20, disposed in the FPU of the computer system, receives instructions via the CBUS and the FPU responds back, as do the other processor bus units, by transmitting certain "handshake" signals including an ACKnowledge handshake signal, a BUSY handshake signal, and an INTerrupt handshake signal. Since the CPU works in a pipeline mode and send PBO commands out every cycle, regardless of whether the last PBO was ACKnowledged, the PBUs must determine whether the last PBO was acknowledged before processing to execute the next PBO. The POBs include a "smart" interface. Therefore, using the smart interface, a PBU must check on the handshakes of other PBUs with the CPU. A PBU is required to send one of the three handshake signals (from the handshakes circuit 20.3 of FIG. 2) to the CPU in the cycle after a PBO was received by the PBU. If hazards are encountered by a PBU, such as the FPU, a BUSY handshake signal is sent to the CPU by a PBU. When the BUSY signal is sent to the CPU, the PBU holds the received instruction and the following instruction in an instruction stack (such as instruction stack 20.1 of FIG. 2 for FPU) so that the sequence of instructions received from the CPU can be maintained. Thus, implemented on the FPU, as part of the instruction stack 20.1, is a CBUS Register 20.1.2 and a CBUS STACK 20.1.1 which hold the received instruction and the following instruction, respectively. Instructions are not stacked unless hazards, which cause generation of the BUSY handshake signal, are encountered. The FPU accepts as many instructions as it can handle; however, the FPU does not contain as much information as is contained by the CPU, since the CPU can halt an instruction before the instruction is even sent to the bus units if it sees, in its buffer of instructions, that problems may be encountered. When PBOs are sent from the CPU that require execution by the FPU and another bus unit, such as the data cache, the FPU has no power to prevent the data cache from starting the execution of the instruction. Thus, the most efficient method for the FPU to pipe is to go as far as possible until a hazard is encountered.

Referring to FIGS. 3a-3c, a construction of the instruction stack 20.1 of FIG. 2 is illustrated. FIG. 3a illustrates the construction of the instruction stack 20.1, FIG. 3b illustrates the bits on the CBUS during a hardwired mode, and FIG. 3c illustrates the bits on the CBUS during a microcode mode.

In FIG. 3a, the instruction stack 20.1 comprises the CBUS Stack register 20.1.1, and a CBUS register 20.1.2 connected to the output of the CBUS stack register 20.1.1. The instruction stack 20.1 as well as the CBUS consist of 25 bits of information for, at most, 2 instructions. This 25 bits of information comprise:

bit 0—the PBO bit which indicates whether the FPU is in a hardwired mode or a microcode mode; if in hardwired mode (0), exceptions are reported to the CPU; if in microcode mode (1), exceptions are stored in the status word (see FIG. 8, element number 20.6d.3) but are not reported;

bit 1—the FPU request bit which signals the FPU that this instruction must be executed by the FPU;

bit 2—the IPU/Cache request bit which signals the cache to decode the instruction;

bit 3—the VP request bit;

bits 17 to 19—in microcode mode, these bits are the SRC, source, identifier bits;

bits 20 and 22—in microcode mode, these bits are the DST, destination, identifier bits;

bits 4 to 10—the instruction opcode bits;

bits 17 to 19—in hardwired mode, these bits are the interrupt tag field which is stored in the status word on an exception; and bit 24—the parity bit used for checking the validity of the instruction.

Thus, the instruction on the CBUS is introduced into the instruction stack 20.1 via the CBUS bits defined above.

Referring to FIG. 4, a construction of the dynamic history table 20.7 of FIG. 2 is illustrated.

In FIG. 4, the dynamic history table 20.7 comprises 17 bits of information stored away for at most 8 instructions at a time. The Dynamic History Table 20.7 consists of data that is needed when it is necessary for an incoming instruction to enter one of pipes 20.6a–20.6d and to complete from these pipes. Since the instructions are stacked, the table 20.7 provides a means of sequencing the completion of execution of instructions of one or more instruction streams. The limitation of the CBUS, to send one instruction at a time, determines the instruction's starting time. Since the execution of the instructions of the one or more instruction streams may take multiple cycles to complete, and since there exists more than one pipe, it is possible that multiple instructions will be executing at the same time. Due to architectural constraints, the instruction completion sequence must be maintained because of possible unpredictable results if an interrupt occurred and the instructions were not sequential. Therefore, there is a need to maintain and store sequencing information and completion information in the table 20.7. The dynamic history table 20.7 stores the following information:

1. the pipe number (PIPE NO),
2. the write address (WR ADDR),
3. whether the instruction is a write type (WT) of instruction,
4. a tag (INT TAG) which uniquely identifies it with an instruction in a stack on the CPU,
5. whether the instruction is an SISD instruction type (M/S), where "M" implies an MIMD instruction type and "S" implies an SISD instruction type,
6. the result length (LEN), 7. whether it is a hardwired or microcoded PBO (H),
8. some retry information (PSW PTR), and
9. a valid bit (V).

The pipe number (PIPE NO) is critical because it sequences the multiple pipes of pipeline circuits 6a–6d of FIG. 2 (four in all). Sequencing is of very little concern in a one pipe system, but, with multiple pipes, tracking information must be maintained. The write address (WR ADDR), write type (WT), and result length (LEN) help in completing the instruction. The tag information (INT TAG) is stored away if an exception occurs and helps in identifying the exact instruction which caused the exception. If it is a SISD instruction, completion is sensed in a different way than looking to see if valid data is disposed at the end of a pipe, but instead, is determined by a counter which counts the cycles. The most important bit is the valid bit (V) which indicates whether the instruction in this entry of the stack is valid. The valid bit (V) is cleared when an exception occurs. The valid bit (V) entry is cleared and the stack is shifted upon completion of an instruction. Thus, a quick method is available to cancel all pending instructions in the FPU, that is, by clearing the valid bit (V) in the dynamic history table 20.7.

Referring to FIGS. 5 and 8, a construction of the pipeline 20.6 of FIG. 2 is illustrated. In particular, FIG. 5 illustrates the construction of pipe1 20.6a which is used for add type instructions, such as add, subtract, divide, compares, and square roots. The FIG. 5 pipe functions in three cycles. FIG. 6 illustrates the construction of pipe2 20.6b, the multiply pipe, which functions in 5 cycles, and is used for multiply instructions. FIG. 7 illustrates the construction of pipe3 20.6c, which is used for load RX type instructions and functions in two cycles. FIG. 8 illustrates the construction of pipe4 20.6d, which is used for all other miscellaneous functions, and which are usually either a write or a read of some auxiliary or status registers.

In FIG. 2, pipeline 20.6a includes a controls section and a pipe1 section. Similarly, pipes 20.6b through 20.6d each include a controls section. The pipeline controls section of pipe 20.6a–20.6d controls the internal parts of each pipe by pushing the operations as far as possible through the pipes and sensing when the FPRs 20.8 are interlocked and by determining where good data can be found. To better understand these controls, it is best to first understand the layout of each pipe. In FIG. 2 and in FIGS. 5–8, pipeline 20.6 comprises four pipes: 20.6a through 20.6d. In MIMD mode, these pipes have different lengths thus creating complexities in controlling these pipes globally. Internal to the pipes, there are registers and, associated with these registers, are status fields.

Figures 5A, 5B:
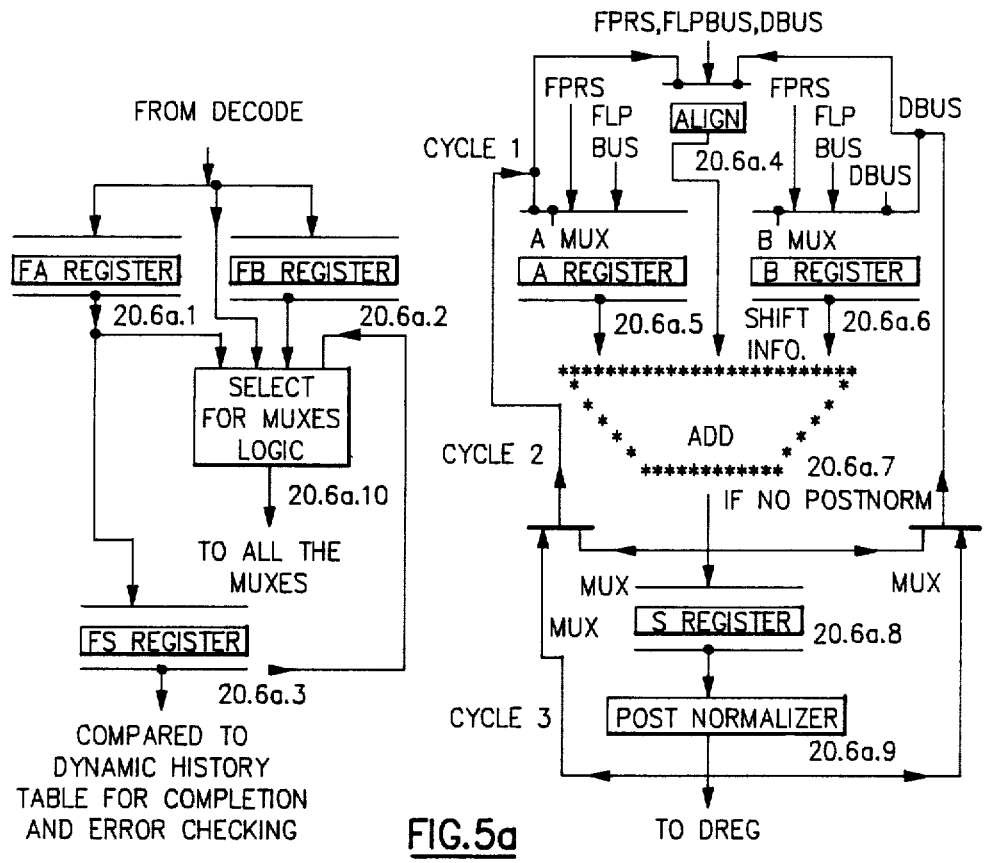
FIG. 5 illustrates the pipe1 (ADD) internal control registers 20.6a of FIG. 2 and includes with appropriate legends FIGS. 5a-5b.

Referring to FIG. 5b, as indicated more thoroughly below, the status fields for the registers in the add pipe of FIG. 5 consist of the operands FPR address (ADDR), whether SISD or MIMD mode is invoked (M/S), some bypass information (2BY), whether this stage in the pipe is for a valid instruction (VI), whether the data in the register is valid (VD), and whether the instruction is RX or RR type (RX).

Referring to FIG. 6b, the status fields associated with the registers of the multiply pipe of FIG. 6 store this information and further information including the length of the operands (LI), whether it's a floating point or fixed point operand (FLP), and whether the data is still valid (VR), even if this stage of the pipe does not have a valid instruction. The other pipes do not need status information because they are very short.

Referring again to FIG. 2, the status information for each stage of the pipe flags to the following stage its validity and then, in the following cycle, the next stage becomes valid if there are no contentions. Thus, the flags help in determining contention and push the instruction's data as far as it can through the pipe. After the pipe in question locates the data on the DBUS and execution takes place in the pipe, the pipe in question waits for the Dynamic History Tables oldest entry to match with the pipe number (PIPE NO) of the pipe in question; at this point, the pipe is allowed to complete thus maintaining instruction completion synchronization.

Referring to FIG. 5, pipe1 (add) internal control registers 20.6a are illustrated.

In FIG. 5a, pipe 1 20.6a includes an alignment register 20.6a.4, an FA register 20.6a.1, an FB register 20.6a.2, an A register 20.6a.5, a B register 20.6a.6, an adder 20.6a.7, an FS register 20.6a.3, and S register 20.6a.8, and a post normalizer register 20.6a.9. In FIG. 5b, status fields associated with the FA register 20.6a.1, FB register 20.6a.2, and FS register 20.6a.3 are illustrated.

FIG. 5 illustrates the add pipe 20.6a and its associated internal pipe control registers. The add pipe of FIG. 5 consists of three cycles. During the first cycle, the data is retrieved from either the FPRs 20.8 and/or from the DBUS. Alignment is accomplished by the alignment hardware 20.6a.4. Operands are latched into A register 20.6a.5 and B register 20.6a.6. In cycle two, the actual add is performed by the adder 20.6a.7 and the result is stored in S register 20.6a.8. In the third and final cycle, the post normalizer 20.6a.9 shifts out leading zeros if required and the data is sent back to the FPRs 20.8. The previously described function reflects the manner in which the pipe handles add instructions. For other instructions, belonging to the same category, at least some of the registers or some of the internal bypassing controls in the pipe are used. Thus, the three cycle add pipe is used for many different instructions. To maintain and control this pipe, three major control registers are needed: FA register 20.6a.1, FB register 20.6a.2, and FS register 20.6a.3.

Referring to FIG. 5b, the status fields for the FA register 20.6a.1, FB register 20.6a.2, and FS register 20.6a.3 are illustrated.

In FIG. 5b, such status fields include the following bits:

1. FPR address bits (ADDR) of the operand which are used to locate operands that may be interlocked
2. A valid instruction bit (VI) which is used to indicate that this stage in the pipe is valid for an instruction
3. A valid data bit (VD) which indicates that the associated data register is valid
4. A MIMD/SISD pipe indicator (M/S) which signals the instruction end. For MIMD mode, its the last stage valid and no contention on completion. For SISD mode, its a little more complex because the instruction may loop several times through the pipe.
5. A bit to indicate that the instruction is an RX type of instruction (RX) which, on the FB register, indicates that its address bits are really invalid and the data bus should be watched for incoming data if not already valid.

6. A bit which indicates the first cycle of a two cycle bypass (2BY). Sometimes it takes two cycles to retrieve interlocked data once it has been located.

Figure 6A:
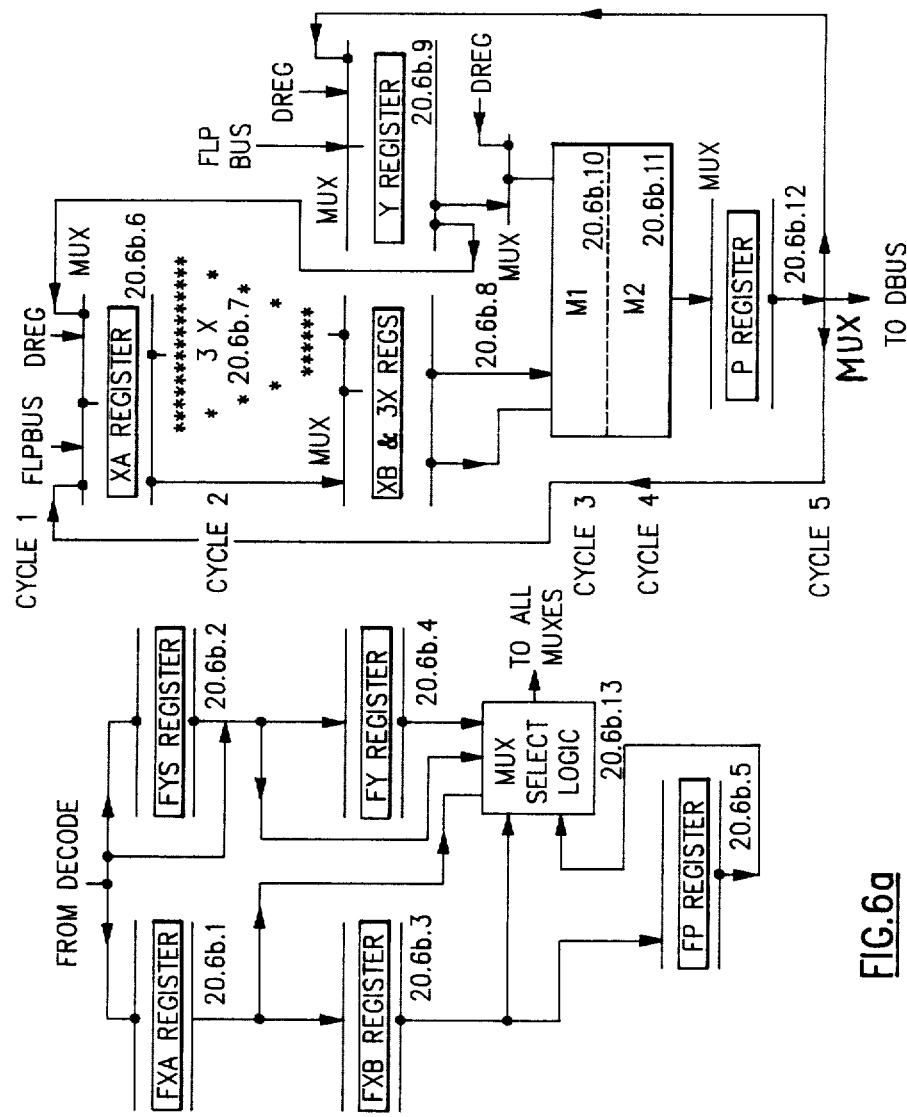
FIG. 6 illustrates the pipe2 (MULT) internal control registers 20.6b of FIG. 2 and includes with appropriate legends FIGS. 6a-6b.

Referring to FIG. 6a, pipe2 20.6b, the multiply pipe, and the control registers, internal to the pipe, is illustrated.

In FIG. 6a, pipe2 20.6b, the multiply pipe, includes FXA register 20.6b.1, FYS register 20.6b.2, FXB register 20.6b.3, FY register 20.6b.4, FP register 20.6b.5, XA register 20.6b.6, 3X hardware 20.6b.7, XB and 3X registers 20.6b.8, Y register 20.6b.9, M1 hardware 20.6b.10, M2 hardware 20.6b.11, and P register 20.6b.12. The multiply pipe consists of 5 cycles if no hazards are encountered:

Cycle 1—Operand 1 is loaded into XA register 20.6b.6 from the FPRs 20.8 and, if operand 2 is also from the FPRs, it is read and stored in a temporary register because the bus structure limits the loading to one operand at a time.

Cycle 2—Operand 2 is loaded from either the temporary register or from the dbus to Y register 20.6b.9; concurrently, a 3 times multiple of operand 1 is calculated by the 3X hardware 20.6b.7 and stored in 3X register 20.6b.8. The XA register 20.6b.6 directly loads XB register 20.6b.8.

Cycle 3 and Cycle 4—These are the two cycles of actual execution of the multiplier. These cycles, termed the M1 and M2 cycle, use the M1 hardware 20.6b.10 and the M2 hardware 20.6b.11. No registers separate the two cycles of execution. Thus, XB and 3X registers 20.6b.8 and Y register 20.6b.9 must be held for these two cycles until the data is latched in P register 20.6b.12.

Cycle 5—This cycle involves a write from P register 20.6b.12 to the FPRs 20.8. If the result is extended, there is a cycle 6, which is a second write cycle, since the bus structure between chips is limited to one 8 byye data bus.

The control registers that control this pipe are: the FXA register 20.6b.1, which maintains the status of XA register 20.6b.6; the FYS register 20.6b.2, which maintains the status of a temporary register that initially gets operand 2 on an RR instruction; the FXB register 20.6b.3; the FY register 20.6b.4; and the FP register 20.6b.5, which maintain the status of their associated paired data registers. These status registers maintain 12 bits of information, as described by FIG. 6b.

Referring to FIG. 6b, a description of each field of the control registers (the FXA register 20.6b.1, the FYS register 20.6b.2, the FXB register 20.6b.3, the FY register 20.6b.4, and the FP register 20.6b.5), is illustrated.

In FIG. 6b, the following is a description of each field:

1. FPR address bits (ADDR) of the operand which are used to locate operands that may be interlocked
2. A valid instruction bit (VI) which is used to indicate that a stage in the pipe is valid for an instruction
3. A valid data bit (VD) which indicates that the associated data register is valid
4. A valid result bit (VR) which is used to create a local working store on another chip. On an RR instruction, operand 2 remains valid (after the multiply operation) in the Y register 20.6b.9 until another instruction modifies this FPR. The valid result bit would indicate that the data in the Y register is valid for the address defined. Also, on an RR and a RX instruction, the product register 20.6b.12, which contains the result of the multiply, is equivalent to the FPR addressed by operand 1 until another multiply goes through the pipe or another instruction modifies this address. This is very important in improving performance. Thus, if any of the loads can be eliminated, there usually is an improvement in performance.
5. A bit to indicate that the instruction is an RX type of instruction (RX) and its address bits are really invalid; the data bus should be watched for incoming data if not already valid.
6. A bit which indicates the first cycle of a two cycle bypass (2BY). Sometimes it takes two cycles to retrieve interlock data once it has been located.
7. A bit to indicate that an extended result (EXT) must be written back to the FPRs.
8. A bit to indicate long operands (LI) are in the registers.
9. A bit to indicate the instruction in this stage of the pipe is a floating point instruction (FLP).
10. A bit to indicate interlock on the Y register's operand (INTL).

The FXA register 20.6b.1 and FYS register 20.6b.2 are set in cycle one by the initialization hardware 20.5. If there is no "contention" on the XB, 3X registers 20.6b.8, the FXB register 20.6b.3 is set from FXA register 20.6b.1. If there is no "contention" on Y register 20.6b.9, the FY register 20.6b.4 is set by the initialization hardware 20.5 or FYHS register 20.6b.2. "Contention" can take the form of:

M1 valid, or

M2 valid and P register contention, or

XA already valid for previous multiply and XB contention

The FP register 20.6b.5 is set by FXB register 20.6b.3 when M2 is valid and there is no contention on P register 20.6b.12. The valid result bit of the FP register 20.6b.5 is maintained separately since it is dependent on other writes to the FPRs. Thus, the multiply pipe is maintained by the internal pipe controls which push the data as far as possible through the pipe until internal hazards are encountered or until the P register 20.6b.12 is valid and no external hazards are encountered which prevent the instructions in this pipe from completing.

Referring to FIG. 7, pipe3 20.6c, which is used for load RX type instructions, is illustrated.

In FIG. 7, the pipe3 20.6c consists of two cycles, during which there is no execution of data, rather, data merely flows through the pipe. The instruction is decoded via decoder 20.2 and the FPU waits for the appropriate DBUS valid signal from the DBUS stack controls 20.10. The data, being received and gated into DREG 20.9.1 of the DBUS stack 20.9, is received during cycle 1. Then, the data is sent to the FPRs 20.8 during cycle 2. The controls which monitor this are the DREG Valid register 20.10.1 of the DBUS stack controls 20.10 and the rest of the DBUS stack controls 20.10.

Referring to FIG. 8, pipe4 20.6d, which performs miscellaneous functions, is illustrated.

In FIG. 8, pipe4 20.6d comprises indirect address registers (IND ADDR REGs) 20.6d.1 connected to an output of the DREG 20.9.1 which forms a part of the DBUS stack 20.9 of FIG. 2, status word register 20.6d..2. connected to the output of the DREG 20.9.1, retry status register 20.6d.3 connected to a CBUS register, and an indirect address mode register 20.6d.4 connected to the CBUS register. The status word register 20.6d.2 and the retry status register 20.6d.3 are connected, at their outputs, to the DREG 20.9.1 and to the PRS2 20.8. Data is loaded from the DBUS into the indirect address registers (IND ADDR REGs) 20.6d.1 and the status word (STATUS WORD) registers 20.6d.2. The indirect address registers 20.6d.1 are used in microcode mode and contain FPR 20.8 addresses. The status word registers 20.6d.2 maintain the status of the FPU, such status consisting of exception status information and the status of the checkers.

In FIG. 8, there are five basic groups of instructions which perform the miscellaneous functions in pipe4 20.6d:

1. The Load RR group—These are basically one cycle operations where a read (possibly a trivial manipulation of bits) is performed followed by a write to the FPRs 20.8.
2. The Load RX group of instructions to other than the FPRs 20.8, such as to the indirect address registers and the status word registers.
3. Instructions in this third group involve two cycles: cycle one involves waiting for the DREG Valid register 20.10.1 to be valid while loading DREG 20.9.1 and cycle two involves loading the DREG valid register 20.10.1 from DREG 20.9.1. Instructions which set registers from information off the CBUS are also included in this category, such registers including the retry status register 20.6d.3, which maintains retry information and the indirect address mode register 20.6d.4, which maintains the mode bit for addressing purposes.
4. The Store RX group of instructions involve reading the FPRs 20.8 in cycle 1 and storing in DREG. In Cycle 2, the data is driven on the data bus and dbus valid is signalled.
5. The last group of instructions are store type instructions which place the contents of a register, other than the FPRs 20.8 onto the DBUS, in two cycles. The two registers that can be read in this way are the status word registers 20.6d.2 and the retry status registers 20.6d.3.

There are no control registers associated with the running of pipe4, except, when applicable, the DBUS stack control registers 20.10.

Figure 9A:
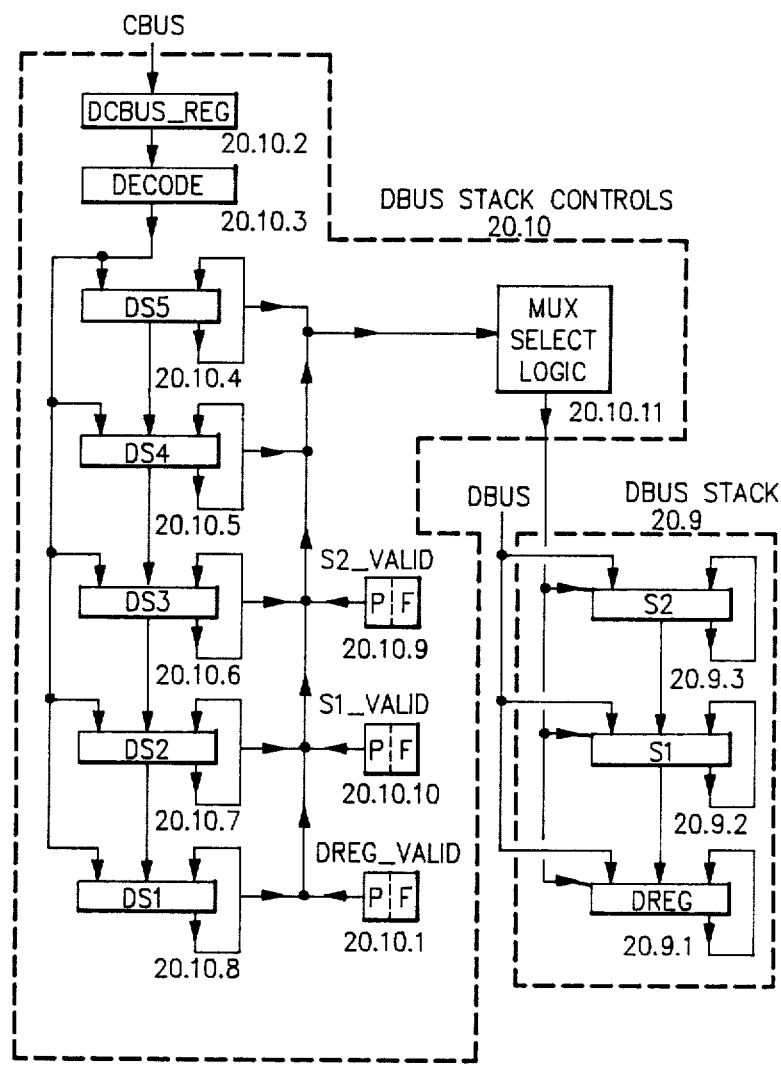
FIG. 9 illustrates the dbus stack 20.9 and the dbus stack controls 20.10 of FIG. 2 and includes with appropriate legends FIGS. 9a-9b.

Referring to FIGS. 9a and 9b, the DBUS stack 20.9 and DBUS stack controls 20.10 are illustrated.

In FIG. 9a, the DBUS stack controls 20.10 comprise the DREG valid register 20.10.1, the DCBUS Register 20.10.2, the decoder 20.10.3, the DS5 register 20.10.4, the DS4 register 20.10.5, the DS3 register 20.10.6, the DS2 register 20.10.7, the DS1 register 20.10.8, the S2 valid register 20.10.9, the S1 valid register 20.10.10, and the mux select logic 20.10.11. The DBUS stack 20.9 comprises the S2 register 20.9.3 connected to the DBUS, the S1 register 20.9.2 connected to the output of the S2 register and to the DBUS, and the DREG register 20.9.1 connected to the output of the S1 register and the DBUS.

The bits within registers DS1-DS5 (20.10.8 through 20.10.4, respectively, of FIG. 9a) include the following:

Bits 0–2 which indicate the instruction address; the three bits, if non zero, indicate that a cross-boundary load shall take place which requires two DBUS valid signals, one for each part of the data.

Bits 3 and 4 which are the pipe number, to uniquely identify the pipe to which the data should be transmitted.

Bit 5 is a valid instruction bit.

Bit 6 indicates the data for this instruction is in DREG 20.9.1 of DBUS stack 20.9 shown in FIGS. 2 and 9a.

Bit 7 indicates the data for this instruction is in S1 register 20.9.2 of DBUS stack 20.9 shown in FIGS. 2 and 9a.

Bit 8 indicates the data for this instruction is in S2 register 20.9.3 of DBUS stack 20.9 shown in FIGS. 2 and 9a.

Bit 9 indicates that the instruction is executing and the appropriate pipe has been initialized.

When data is received, it must find its way to the appropriate instruction, which then transmits through the pipes as described previously. This creates a chaotic condition. This chaotic condition, involving data finding its way to its correct instruction in the appropriate pipe, will be described in depth in the following section. Data, for an operation involving normal RR operations, comes from the FPRs 20.8, unless an interlock exists, in which case, the local pipe controls find the appropriate data by comparing address fields of status registers of all the pipes. For RX operations, it is a little more difficult; operand one is found in the same way, but operand two comes from the data bus. Since the data cache or another bus unit is requested to supply the data at the same time that the FPU receives the instruction, and the other bus unit, which is requested to supply the data, may be BUSY, the receipt of the data by the FPU may be out of synchronization with the receipt of the instruction by the FPU. As a result, underflow or overflow of the data may exist. The DBUS stack controls 20.10 inform the local pipe controls 20.6 when the DREG 20.9.1 is valid for their appropriate pipe. This is vital in separating the data, especially when several pipes are starved of data from the data bus and the data bus becomes valid. Therefore, the DBUS stack controls 20.10 sequences the data with the instructions. After this is accomplished, the pipe controls 20.6 move the data through the pipe and await the approval of the global Dynamic History Table 20.7 to approve the completion of the instruction (as will be discussed later, completion consists of comparing the pipe number of the oldest instruction in the dynamic history table 20.7 file, i.e., the lowermost entry in the table, with the pipe number of the pipe in question). Thus, the Data Flow is controlled from start to finish. In addition, the data bus stack controls 20.10 are needed since the memory supplies the data when it can, independently of when the data is requested. Thus, conditions of overflow and underflow of data are possible. Underflow occurs when the memory is slow in supplying the data and several pipes have been initialized, except for the absence of an operand from memory (RX type). Since several pipes may be waiting for data, when it finally arrives, controls are needed for sorting out to which pipe the incoming data should be transmitted. Overflow occurs when a pipe or several pipes are full and several instructions, which use the data from memory, are transmitted from the CPU to the floating point unit (FPU) and memory simultaneously; this causes the memory to send the data to the floating point unit, since it cannot immediately put the data into an appropriate pipe. Therefore, the data must be stacked and identified with the appropriate pipe number to which the data must eventually be transmitted.

Figure 10:
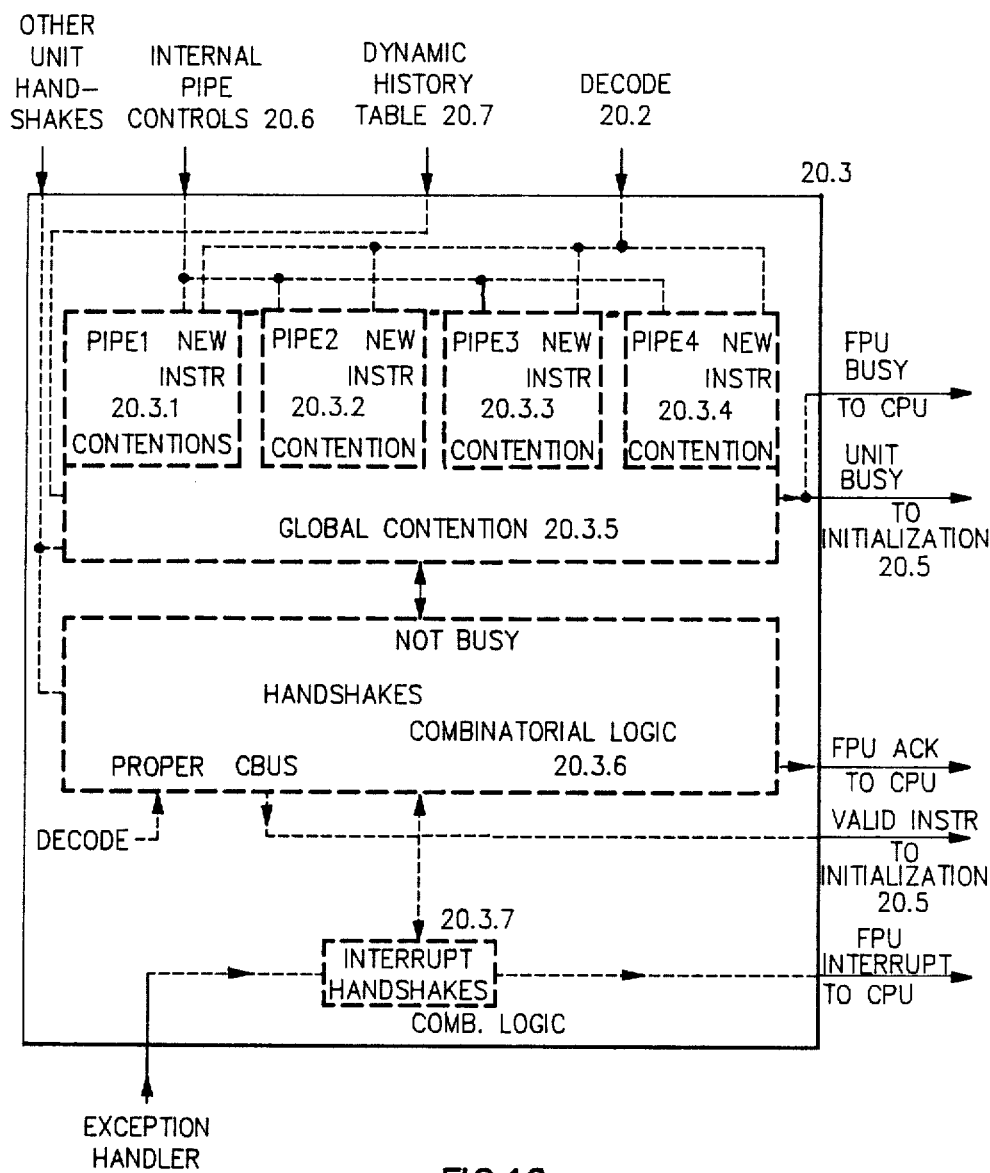
FIG. 10 illustrates a construction of the handshakes and global hazards circuit 20.3 of FIG. 2.

Referring to FIG. 10, the handshakes and global hazard circuit 20.3 is illustrated.

In FIG. 10, handshakes and global hazards circuit 20.3 comprises a pipe1 new instruction contentions circuit 20.3.1, a pipe2 new instruction contention circuit 20.3.2, a pipe3 new instruction contention circuit 20.3.3, and a pipe4 new instruction contention circuit 20.3.4, all of which are connected to the internal pipe controls 20.6, and to the decode circuit 20.2 of FIG. 2; a global contention circuit 20.3.5 connected to the dynamic history table 20.7 and responsive to other unit handshakes for transmitting a "FPU BUSY" signal to the computer system CPU and for transmitting a "UNIT BUSY" signal to the initialization circuit 20.5; a handshakes combinatorial logic circuit 20.3.6 is connected to the global contention circuit 20.3.5 and is responsive to the other unit handshakes for transmitting a "FPU ACK" (floating point unit acknowledge) signal to the computer system CPU and for transmitting a "VALID INSTR" (valid instruction) signal to the initialization circuit 20.5; and an interrupt handshakes combinatorial logic circuit 20.3.7 connected to the handshakes combinatorial logic 20.3.6 and to the exception handler circuit 20.11 for transmitting a "FPU INTERRUPT" (floating point unit interrupt) signal to the computer system CPU.

In FIG. 10, the inputs to the handshakes and global hazard circuit 20.3 include the handshakes from the other PBUs, the internal pipe controls 20.6, the dynamic history table 20.7, and the decode circuit 20.2. The "decode circuit" input informs the handshakes circuit 20.3 if there is a new instruction on the CBUS and in which pipe the new instruction needs to be executed. The "internal pipe controls" input indicates, for each pipe, whether there are any hazards in the first stage of the pipe. The "other unit handshakes" input is monitored by the handshakes circuit 20.3 to see if hazards exist external to the FPU. The "dynamic history table" input indicates if there are any internal global hazards. If there are no hazards and there is no contention in the pipe in which the new instruction must be executed, as indicated in FIG. 10, "FPU ACK" (acknowledge) is sent from the handshake combination logic to the CPU and the other bus units (except in the case where the instruction is for more than one bus unit and then the acknowledge is suppressed). If there exists a new instruction but there exists hazards or contentions, then "UNIT BUSY" is sent to the initialization circuit and "FPU BUSY" is sent to the CPU and the other PBUs; in addition, the new instruction is held in CBUS register 20.1.2 of the instruction stack 20.1 of FIG. 3 and is again considered as a new instruction in the next cycle and subsequently until there exists a cycle during which it can be acknowledged. "VALID INSTR" (valid instruction) is sent to the initialization circuit and is an early signal which indicates that the instruction in the CBUS register has the proper CPU handshakes to indicate that it is an instruction that the FPU should execute; that is independent of hazards and contentions. The last signal which is sent from this unit is "FPU INTERRUPT" which is sent to the CPU indicating an exception condition. This signal must be gated from the exception handler 20.11 which determines the exception condition, because it is dependent on the response of the other PBUs to previous instructions. In a pipelined computer, several instructions are issued and executed in parallel. As a result, several exceptions can occur in the same cycle. Since the instruction set is SISD, exceptions must be handled as though the instructions were executed sequentially. This is done by gating the FPU INTERRUPT signal with conditions determined from the handshake controls. Thus, handshake and global hazard detection is accomplished by the handshakes and global hazards circuit 20.3 in FIG. 10 and FIG. 2.

Figure 11:
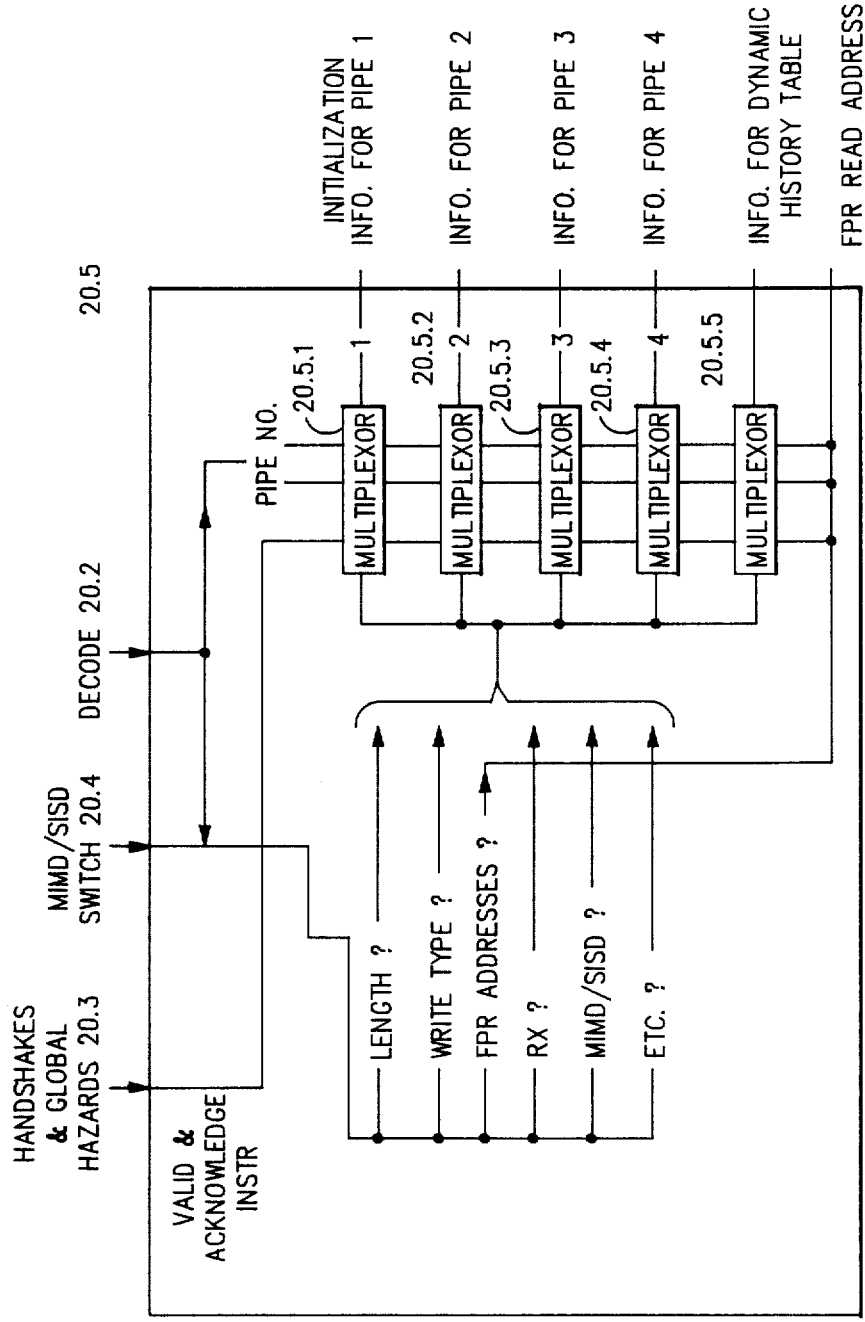
FIG. 11 illustrates a construction of the initialization circuit 20.5 of FIG. 2.

Referring to FIG. 11, the initialization circuit 20.5 is illustrated.

In FIG. 11, the initialization circuit 20.5 is responsive to an output signal from the handshakes and global hazards circuit 20.3, the decode circuit 20.2, and the mimd/sisd switch 20.4. The output signal from the handshakes and global hazards circuit 20.3 includes the VALID INSTRUCTION signal and the ACKNOWLEDGE signal. The output signal from the decode circuit 20.2 includes the following information: length information (LENGTH) relating to the length of the instruction's data (short length data must be zero-filled); write type (WRITE TYPE) information providing address information when a write to the floating point registers (FPRs) 20.8 is being performed; fpr address information (FPR ADDRESSES) relating to address information when data is being retrieved from the FPRs 20.8; RX instruction information (RX) indicating whether the instruction being input to the initialization circuit 20.5 is an RX type instruction (for an RX type instruction, the second portion of the instruction's data comes from the main memory via the DBUS, not from the FPRs 20.8); "etc", which may provide any other information needed by the pipe controls for pipes 20.6a–20.6d; and the pipe number (PIPE NO) which provides the pipe number, the identifier of one of pipes 20.6a–20.6d. The decode circuit 20.2 provides the pipe number because each of the pipes 20.6a–6d are specialized to function in association with special instructions and the decode circuit 20.2 knows, by virtue of its decode function, what type of instruction is being input to the initialization circuit 20.5 and therefore what pipe into which the incoming special instruction should be inserted for execution. The output of the mimd/sisd switch 20.4 provides information relating to the "position" of mimd/sisd switch 20.4. The initialization circuit 20.5 comprises a first multiplexer 20.5.1, a second multiplexer 20.5.2, a third multiplexer 20.5.3, a fourth multiplexer 20.5.4 and a fifth multiplexer 20.5.5, each multiplexer receiving the same selection signal and the same information signal. The selection signal selects the specific multiplexer, depending upon the binary bit representation of the selection signal. The information signal passes through the selected multiplexer, selected in accordance with the selection signal. The selection signal comprises the (1) VALID INSTRUCTION/ACKNOWLEDGE signal output from the handshakes and global hazards logic 20.3, and the (2) pipe number "pipe no" output from the decode logic 20.2. The information signal comprises (1) length, (2) write type, (3) FPR addresses, (4) RX, (5) MIMD/SISD, and (6) other information (etc). In operation, when a specific multiplexer (one of 20.5.1–20.5.5) is selected via the selection signal including the PIPE NO signal and the VALID INSTRUCTION/ACKNOWLEDGE signal, the information signal, including the length information, the write type information, the FPR address information, the RX instruction information, the MIMD/SISD switch information, and the other information, is passed to one of pipes 20.6a–20.6d and/or to the dynamic history table 20.7.

A description of the functional operation of the dynamic MIMD pipeline 20 of the present invention will be set forth in the following paragraph with reference to FIGS. 2 through 8 of the drawings. In FIG. 2, assume that a plurality of instruction streams, each containing a plurality of instructions, await execution by processors disposed within the pipeline circuits 6 of FIG. 2. A selection circuit, not shown in the drawings, selects from among the plurality of instruction streams, instructions which shall be input to the dynamic MIMD pipeline 20 of FIG. 2. These instructions are input, one by one, to the dynamic MIMD pipeline 20 via the CBUS. When an instruction is transmitted to the dynamic MIMD pipeline 20 disposed in the FPU of FIG. 2, via the CBUS, it is decoded via decoder 20.2 and a determination is made whether such instruction is one which may be executed by the FPU. The receipt of such instruction is acknowledged by the handshakes and global hazards circuit 20.3 (an acknowledge handshake signal is transmitted from the handshakes circuit 20.3 back to the CPU) and the instruction is executed as soon as possible. The CPU will continuously send instructions to the FPU shown in FIG. 2, without stopping, assuming that continuous FPU processing is possible. Assuming that data and instructions of an instruction stream, a plurality of instruction streams, or a single instruction is present and ready for input to the FPU via the CBUS, the FPU will: decode the instructions, one at a time, via decoder 20.2, decide if the pipeline will operate in SISD or MIMD mode, via switch 20.4, determine if any hazards exist, via global hazards logic 20.3, determine, via the decode logic 20.2 and the initialization logic 20.5, which pipe, 20.6a–20.6d, will execute the instruction, decide via the dynamic history table 20.7 when the appropriate pipe 20.6a–20.6d will complete so that the incoming instruction may be inserted therein for execution, and, when all the above is accomplished, the FPU will attempt to execute the instruction(s) by entering the pipeline structure 20.6 at a maximum rate, one at a time. The initialization logic 20.5 along with the global hazard circuit 20.3 will decide if a stream is beginning or ending and will appropriately inform the CPU of normal or abnormal endings of a stream of instructions as well as single instructions. Due to the potential existence of hazards, the initialization logic 20.5, together with the global hazard control logic 20.3, will decide when one of pipelines, 20.6a–20.6d, shall be utilized and when instructions are needed. Recall that the pipes 20.6a–20.6d are each specialized to handle certain categories of instructions. When an incoming new instruction is decoded via decoder 20.2, the type of instruction is determined and thus the particular pipe to use is identified. The initialization logic 20.5 receives the pipe number from the decode logic 20.2, and, via multiplexers 20.5.1–20.5.5, transmits the new instruction to its corresponding pipeline circuit, one of 20.6a–20.6d, in accordance with the received pipe number. When the instruction enters one of the pipes 20.6a–20.6d, the dynamic history table 20.7 is updated to record the identity of the pipe in which the instruction is disposed for execution. Since the pipes 20.6a–20.6d are connected to the dynamic history table 20.7 in feedback fashion, the status of execution of the particular instruction in the pipe is continuously recorded in the dynamic history table 20.7. Therefore, when a further new instruction is identified, via decoder 20.2 and initialization circuit 20.5, as corresponding to a particular pipe and is ready to be introduced into the particular pipe, information stored in the pipe controls associated with the first stage of the particular pipe is read in order to determine if internal hazards exist within the particular pipe, such as data interlock or the pipe being full. The further new instruction cannot enter the particular pipe if the pipe is full of instructions or internal hazards exist. Table 20.7 is then consulted to determine if the pipe number of the particular pipe is indicated in the pipe number column of the lowermost entry of the table 20.7. For example, if the particular pipe is identified by number X and has three pipeline stages, and if the table 20.7 contains three entries indicating pipe number X in the pipe number column, the pipe X is full of instructions and the oldest instruction in the pipe X must complete before the further new instruction can enter for execution. When the oldest (lowermost) entry in the table 20.7 indicates pipe number X in the pipe number column, the oldest instruction in pipe X is allowed to complete, making room for insertion of the further new instruction for execution. In summary, the table 20.7 with the internal pipe controls for pipes 20.6a–d are continuously consulted to assure that the proper utilization of all single pipelines is achieved, and instructions are executed from beginning to end in a proper manner. Each pipeline, one of 20.6a–20.6d, will execute a category of instructions and will be controlled externally by the information stored in the dynamic history table 20.7 and the initialization logic 20.5 and internally by the internal pipe controls. When possible, each pipeline, one of 20.6a–20.6d, will be executing more than one instruction pertaining to a multiple number of instruction streams and each pipeline, one of 20.6a–20.6d, is controlled by its corresponding internal pipeline controls (see 20.6a–20.6d) to guarantee maximum utilization of the pipeline.

A description of the functional operation of the dynamic history table 20.7 will be set forth in the following paragraph with reference to FIGS. 2 and 4 of the drawings.

In FIG. 4, if the acknowledge signal is sent from the handshakes circuit 20.3 or if the busy signal is dropped by the handshakes circuit 20.3, the incoming instruction is put into a line of the dynamic history table 20.7. This table 20.7 contains a few parameters which are necessary in order to determine how to complete the incoming instruction. The key parameter is the pipe number (PIPE NO) which indicates in which pipe an instruction in one of the pipes is disposed. Thus, since sequential execution must be faked to comply with architectural constraints, the history table 20.7 is read each cycle to indicate which pipe, 20.6a–20.6d of pipeline circuit 20.6, will be the next pipe to complete the execution of an incoming instruction. The information read from table 20.7, during each cycle, is then compared with the internal status of the selected pipe (via its status registers) to see if the pipe is waiting to complete. If so, the instruction is completed and the corresponding entry in the dynamic history table 20.7 is erased from the history table 20.7 file. Stated differently, when a pipe having number X has instructions executing therein and the pipe number X is recorded in the oldest (lowermost) entry in the pipe number column of the dynamic history table 20.7 file, completion of the oldest one of such instruments in pipe X consists of comparing the parameters stored in table 20.7 associated with oldest (lowermost) instruction in the dynamic history table 20.7 file with the status of the pipe X, as indicated by its status registers. If the status registers of pipe X indicate that execution of its oldest instruction is complete, the execution results of the oldest instruction are transmitted out of pipe X to its appropriate destination; the contents of the pipe X are shifted one stage, leaving room for insertion of the new further instruction in pipe X for execution.

The functional operation of the DBUS stack 20.9 and the DBUS stack controls 20.10 will be described in the following paragraph with reference to FIG. 9 of the drawings.

In FIG. 9a, there are two stacks: one stack for instructions, i.e., DS1 to DS5 registers 20.10.8 to 20.10.4 of the DBUS stack controls 20.10, and one stack for data, i.e., the DREG 20.9.1, the S1 register 20.9.2, and the S2 register 20.9.3 of the DBUS stack 20.9. The stack of instructions are obtained by decoding the CBUS; to do this, another register is needed, the DCBUS register 20.10.2, which latches the CBUS every cycle independent of the busy signals. The Decode hardware 20.10.3, combined with knowledge of the previous busys, indicates when a new DBUS load instruction enters the FPU. Thus, information is maintained relating to every load DBUS type instruction until the data arrives and the instruction begins. Other important status registers are DREG valid 20.10.1, S1 valid 20.10.10, and S2 valid 20.10.9, each of which comprise two bits, each indicating whether the data is partially or fully valid. Overflow of data occurs when instructions are in the DS registers 20.10.4–20.10.8 but are not executing and data is in the data stack 20.9.1–20.9.3. Underflow of data occurs when several instructions are in the DS registers 20.10.4–20.10.8 but not enough data is in the data stack 20.9.1–20.9.3. Incoming data is stacked in the S2, S1, and DREG registers 20.9.3 through 20.9.1, respectively, of the DBUS stack 20.9, and incoming instructions are stacked in the DS5 through DS1 registers 20.10.4 through 20.10.8 of the DBUS stack controls 20.10, there being a one-to-one correspondence between the stacked instructions needing DBUS data and the stacked data. Since the incoming data is stacked in the DBUS stack 20.9, and the incoming instructions are stacked in the DBUS stack controls 20.10, when a set of data arrives on the DBUS and is ready for placement in one of pipes 20.6a–20.6d, it is necessary to determine which pipe, one of 20.6a–20.6d, gets the set of data. Since there is a one-to-one correspondence between the data stacked in the S2, S1, and DREG registers of the DBUS Stack 20.9 and the instructions stacked in the registers DS3, DS2, and DS1 of the DBUS stack controls 20.10, the arriving set of data goes to the pipe (one of 20.6a–20.6d) whose number is stored in bit positions 3 and 4 of the lowest one of the data stack control registers DS5–DS1, the DS1 register 20.10.8 (recall that bits 3 and 4 within the registers DS1–DS5 are the pipe number, to uniquely identify the pipe to which the data should be transmitted).

Referring to FIG. 12, in order to further describe the functional operation of the dynamic MIMD pipeline of the present invention, a simple instruction stream is illustrated. With the assistance of FIGS. 2 through 11, the manner by which the instruction stream flows through hardware of FIG. 2 is set forth in the following paragraphs.

Consider the following three instructions which form an instruction stream: (1) a load RX to FPR 1, (2) a multiply RR long of FPR1 and FPR2 with the long result stored in FPR 1, and (3) an add RR long of FPR3 and FPR 4 with the long result stored in FPR3. The following observations may be made regarding this instruction stream: (a) each instruction requires a different pipe to execute; (b) the load instruction stores to a register used by the multiply instruction—this contention could cause interlock if the multiply instruction is received before the write (load) takes place; and (c) the add instruction does not require the use of any FPRs 20.8 which are used by any of the other prior instructions in the stream. The following is a cycle by cycle description of how this instruction stream would be handled in the hardware of FIG. 2.

Cycle 0—The CPU sends a load RX instruction to the FPU on the CBUS and the CBUS is latched into CBUS register 20.1.2 of FIG. 3 and DCBUS register 20.10.2 of FIG. 9.

Cycle 1—The load RX is decoded by the decode circuit 20.2 in FIG. 2 and decode circuit 20.10.3 of the DBUS stack controls 20.10 in FIG. 9. The handshakes and global hazard circuit 20.3 of FIG. 2 and FIG. 10 determines, by checking internal pipe control of pipe 3 20.6c, that there are no problems for a load instruction to begin and no global hazards exist, as determined by checking the dynamic history table 20.7. Thus an acknowledge signal (FPU ACK) is sent from the handshakes and global hazards circuit 20.3 to the initialization circuit 20.5 which initializes pipe3 20.6c (FPU ACK is not sent to the other bus units because the data cache responds for both units in the case of a multi-bus unit PBO). The initialization hardware 20.5 also provides information to place the load instruction in the dynamic history table 20.7. The DBUS stack controls 20.10 place information about the load instruction into DS1 register 20.10.8 of FIG. 9 since the decode 20.10.3 of FIG. 9 determined it was an RX instruction. Also, a data valid signal was received on the DBUS, the signal being latched into DREG 20.9.1 of the DBUS stack 20.9; as a result, DREG valid latch 20.10.1 of the DBUS stack controls 20.10 becomes active. During this cycle, the CPU sends a multiply RR instruction to the FPU on the CBUS and this instruction on the CBUS is latched into CBUS register 20.1.2 of the instruction stack 20.1 and into the DCBUS register 20.10.2 of the DBUS stack controls 20.10.

Cycle 2—The multiply RR instruction is decoded by the decode circuit 20.2 in FIG. 2 and decode circuit 20.10.3 in FIG. 9. The handshakes and global hazard circuit 20.3 of FIG. 2 and FIG. 10 determines, from checking internal pipe control of pipe2 20.6b, that there are no problems for a multiply to begin and no global hazards exist, as determined from checking the dynamic history table 20.7. Thus an acknowledge signal (FPU ACK) is sent to the CPU and to the other PBU; the initialization circuit 20.5 initializes pipe2 20.6b and also reads FPR2 out of the FPRs 20.8 onto the FLPBUS of FIG. 6 to be latched into Y register 20.6b.9. The initialization hardware 20.5 also provides information to place the multiply instruction in the dynamic history table 20.7. The initialization hardware 20.5 also notices, from the global hazard logic 20.3 which decoded the dynamic history table 20.7, that FPR 1 is interlocked by the load instruction and thus operand 1 of the multiply is interlocked. The initialization hardware 20.5, from information from the decode 20.2, initializes the control registers FXA 20.6b.1 and FY register 20.6b.6. The DBUS stack controls decode circuit 20.10.3 of FIG. 9 determined that the multiply RR instruction does not use the DBUS but, rather, is interlocked by DREG 20.9.1 and thus DREG 20.9.1 is loaded into XA register 20.6b.6 of FIG. 6. The DREG 20.9.1 is valid this cycle and the FPRs 20.8 are loaded (written into) to complete the load instruction (the completion of the load instruction is allowed to occur as a result of the DREG valid register 20.10.1 of FIG. 9 and the dynamic history table 20.7 which indicated that the next pipe to complete is pipe3). The CPU sends an add RR instruction to the FPU on the CBUS and the CBUS is latched into CBUS register 20.1.2 of the instruction stack 20.1 and DCBUS register 20.10.2 of the DBUS stack controls 20.10.

Cycle 3—The add RR instruction is decoded by the decode circuit 20.2 in FIG. 2 and decode circuit 20.10.3 in FIG. 9. The handshakes and global hazard circuit 20.3 of FIG. 2 and FIG. 10 determines, from checking internal pipe control of pipe1 20.6a, that there are no problems for an add to begin and no global hazards exist, as determined from checking the dynamic history table 20.7. Thus an acknowledge signal (FPU ACK) is sent from the handshakes circuit 20.3 to the CPU and the other PBUs. The initialization circuit 20.5 initializes pipe1 20.6a and also reads FPR3 and FPR4 out of the FPRs 20.8 into A register 20.6a.5 and B register 20.6a.6 of FIG. 5. The initialization hardware 20.5 also provides information to place the add instruction in the dynamic history table 20.7 and notices, from the global hazard logic 20.3 which decoded the dynamic history table 20.7, that no interlock exists. From information provided from the decode circuits, the initialization hardware 20.5 initializes the control registers, FA register 20.6a.1 and FB register 20.6a.2 of FIG. 5. In FIG. 6, the multiply hardware holds the value in Y register 20.6b.9, due to contentions determined by the mux select logic 20.6b.13, performs a 3X calculation, via 3X hardware 20.6b.7, and latches XB and 3X registers 20.6b..8. The control information for the multiply instruction is held in FY register 20.6b.4 of FIG. 6 and is transferred from FXA register 20.6b.1 to FXB register 20.6b.3. In FIG. 5, the align 20.6a..4 of the add instruction is also accomplished during this cycle.

Cycle 4—In FIG. 6, both operands are available and ready to be multiplied from XB and 3X registers 20.6b.8 and Y register 20.6b.9; thus the M1 cycle begins and the M1 hardware 20.6b.10 is used to perform the multiplication. In FIG. 5, the add enters cycle two and goes through the adder 20.6a.7 and is latched in S register 20.6a.8. The FA control register 20.6a.1 data is transferred to FS register 20.6a.3.

Cycle 5—In FIG. 6, the multiply begins the M2 cycle and uses the M2 hardware 20.6b.11 and is latched in P register 20.6b.12. FXB control register sets FP register 20.6b.5. In FIG. 5, The add must wait in S register 20.6a.8 because the dynamic history table 20.7 indicates pipe2 20.6b of FIG. 6, for the multiply instruction, must complete next.

Cycle 6—In FIG. 6, the multiply instruction completes because P register 20.6b.12 is valid, as is indicated by FP register 20.6b.5, and the dynamic history table 20.7 indicates that this pipe completes next. The dynamic history table 20.7 provides the write address and length to the FPRs 20.8 to complete the multiply. In FIG. 5, the add must wait in S register 20.6a.8 because the dynamic history table 20.7 indicates pipe2 of FIG. 6 must complete next.

Cycle 7 - In FIG. 5, the add completes because FS register 20.6a.3 indicates that S register 20.6a.8 is valid and the dynamic history table 20.7 points to the add pipe to be the next pipe to complete.

Thus, execution of the instruction stream has been completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pipelined processing apparatus having a plurality of pipelined processors accomodating different types of instructions, comprising:
   receiving means for receiving incoming instructions, which receiving means includes decode means for decoding each of the incoming instructions thereby identifying a category type for said each of the incoming instructions;
   a plurality of pipelined processors each connected to said receiving means for temporarily holding at least some of the incoming instructions for execution, each pipelined processor being identified by a unique number;
   switch means connected to said receiving means and coupled to said plurality of pipelined processors, said switch means changing to a standard single pipelining mode for a first category of instructions identified by said decode means and changing to a dynamic multiple pipelining mode for a second category of instructions identified by said decode means, with each instruction in said second category of instructions having the unique number for the pipelined processor which accomodates that type of instruction;
   table means connected to the plurality of pipelined processors and to the receiving means for recording the numbers of one or more pipelined processor means in which said at least some of the incoming instructions are temporarily held for execution, and for controlling the completion of instruction processing by the plurality of pipelined processors so that such completion will be in a predetermined sequence; and
   wherein said receiving means determines if a particular one of the pipelined processors is available for use, said receiving means inserting an incoming instruction in said particular one of the pipelined processors for execution when said particular one of the pipelined processors becomes available for use.

2. The apparatus of claim 1 wherein said first category of instructions which are processed in a standard single pipelining mode includes instructions having a length outside a predetermined range of bits or instructions which are more difficult to execute such as divides and square roots.

3. The apparatus of claim 1 which further includes hazard circuit means interconnected between said receiving means, said table means and said plurality of pipelining processors, for detecting data dependent hazards as well as collision hazards and for generating control signals to either allow or alternatively prevent execution of an instruction by one of the pipelined processors.

4. The apparatus of claim 1, wherein said particular one of the pipelined processors is available for use when the particular pipelined processor is not full of instructions of when, if the particular pipelined processor is full of instructions, the number of the particular pipelined processor matches one of the numbers recorded in the table means and, if the numbers match, the oldest one of said instructions in said particular pipelined processor has been executed.

5. The apparatus of claim 1, wherein said receiving means records the number of said particular one of the pipelined processors in said table means when said receiving means inserts said particular incoming instruction in said particular one of the pipelined processors for execution.

6. The apparatus of claim 1, wherein said receiving means comprises stacking means for stacking at least one of the incoming instructions.

7. The apparatus of claim 6, wherein said receiving means comprises decode means connected to the stacking means for decoding the oldest one of the stacked incoming instructions thereby producing a decoded output signal.

8. The apparatus of claim 7, wherein said receiving means comprises handshake means responsive to the decoded output signal of said decode means for developing a valid instruction signal and an acknowledge signal if said oldest one of the stacked incoming instructions is valid.

9. The apparatus of claim 8, wherein said receiving means comprises selection means responsive to said decoded output signal, said acknowledge signal, and said valid instruction signal for identifying and selecting a particular one of the plurality of pipelined processor means in accordance with said decoded output signal, said valid instruction signal, and said acknowledge signal and for passing certain characteristics of said oldest one of the stacked incoming instructions to the selected particular one of the plurality of pipelined processor means when the particular pipelined processor means is selected.

10. The apparatus of claim 6, wherein said stacking means comprises first stacking means for stacking at least two of the incoming instructions and second stacking means for also stacking said at least two of the incoming instructions, said second stacking means storing the numbers of the pipelined processor means in which said at least two of the incoming instructions are held for execution.

11. The apparatus of claim 10, further comprising: data receiving means for receiving incoming data corresponding to said incoming instructions, said data receiving means including third stacking means for stacking the incoming data.

12. The apparatus of claim 11, wherein the instructions stacked in said second stacking means correspond, respectively, to the data stacked in said third stacking means whereby the oldest one of the instructions stacked in said second stacking means is executed in conjunction with corresponding data stacked in said third stacking means.

13. The apparatus of claim 12, wherein said oldest one of the instructions stacked in said second stacking means is also being held in one of said plurality of pipelined processor means, said corresponding data being transmitted to said one of said plurality of pipelined processor means for association with said oldest one of the instructions in accordance with the number of said one of said plurality of pipelined processor means stored in said second stacking means.

14. In an apparatus including an instruction receiving means for receiving instructions, a plurality of pipelined processor means, each pipelined processor means including internal pipe controls, a table means connected to the instruction receiving means and the plurality of pipelined processor means, and data receiving means for receiving data corresponding to the received instructions, a method of inserting a received instruction received via the instruction receiving means into one of the pipelined processor means and for associating a corresponding received data received via said data receiving means with said received instruction in said one of the pipelined processor means, comprising the steps of:

identifying said received instruction thereby determining the identity of said one of the pipelined processor means from among said plurality of pipelined processor means;

consulting said table means and the internal pipe controls associated with said one of the pipelined processor means to determine if said one of the pipelined processor means is ready for receipt of said received instruction and said corresponding received data;

stacking said instructions received via said instruction receiving means, including said received instruction, in an instruction stacking means, each instruction in each stack of the instruction stacking means including a number identifying one of the pipelined processors;

separately stacking said data received via said data receiving means, including said corresponding received data, in a data stacking means, there being a one-to-one correspondence between the stacked instructions and the stacked data; and transmitting said received instruction and said corresponding received data from said instruction receiving means and said data stacking means to said one of the pipelined processor means identified in accordance with the number associated with said received instruction stored in said instruction stacking means when said one of the pipelined processor means is ready for receipt of said received instruction and said corresponding received data.

15. The method of claim 14, further comprising the step of storing in said table means the numbers of said plurality of pipelined processor means which previously received an instruction and its corresponding data, and wherein said consulting step includes searching said table means to determine if the number of said one of the pipelined processor means is recorded in said table means.

16. The method of claim 15, wherein said searching step includes determining if said number is located in a certain position in said table means indicating the oldest entry in said table means.

17. The method of claim 16, wherein after the searching step, if the number of said one of said plurality of pipelined processor means associated with said received instruction is recorded in said certain position in said table means, checking said one of said plurality of pipelined circuit means to determine if the oldest one of said previously received instructions has been fully executed to completion, and if so, allowing it to exit said one of said plurality of pipelined processor means, whereby if the oldest previously received instruction is processed to completion and is allowed to exit, the transmitting step to said one pipelined processor means can be performed for another of said received instructions and its corresponding data.

* * * * *